United States Patent [19]
Klappert et al.

[11] Patent Number: 5,450,597
[45] Date of Patent: Sep. 12, 1995

[54] METHOD AND APPARATUS FOR SYNCHRONIZING MIDI DATA STORED IN SUB-CHANNEL OF CD-ROM DISC MAIN CHANNEL AUDIO DATA

[75] Inventors: Walter R. Klappert, Topanga; Michael Case, Sherman Oaks, both of Calif.

[73] Assignee: Time Warner Interactive Group Inc., Burbank, Calif.

[21] Appl. No.: 807,274

[22] Filed: Dec. 12, 1991

[51] Int. Cl.$^6$ .................................................. G11B 7/00
[52] U.S. Cl. ........................... 395/800; 364/DIG. 2; 369/47; 369/48; 369/50; 369/275.3
[58] Field of Search ........................ 395/800; 369/60, 69, 369/70, 83, 84, 49, 93, 98, 292, 47, 48, 50; 84/645, 666, 712; 364/DIG. 2

[56] References Cited

U.S. PATENT DOCUMENTS

5,138,925  8/1992  Koguchi et al. ........................ 84/609

Primary Examiner—Alyssa H. Bowler
Assistant Examiner—Valerie Darbe
Attorney, Agent, or Firm—Blakely, Sokoloff, Taylor & Zafman

[57] ABSTRACT

A method and apparatus for ensuring that MIDI data stored in the subcode channel area of a compact disc is synchronized with the main channel audio of the compact disc. Synchronization problems have been created when transferring audio on a tape from an audio studio to a PCM 1630 tape which is to be used as a compact disc master resulting in a squashing or stretching of the audio data with respect to the MIDI data. One reason this can occur is because F-1 tape records and plays back at 29.97 frames per second while PCM 1630 tape records and plays back at 30 frames per second. The result is that even if the MIDI data and main channel audio data begin in sync, they lose sync during transfers and may drift apart linearly over time as well as be offset with respect to each other. The present invention corrects such synchronization problems by playback simulation, MIDI data/Main channel audio sync measurement and MIDI data adjustment.

5 Claims, 9 Drawing Sheets

METHOD AND APPARATUS FOR SYNCHRONIZING MIDI DATA STORED IN SUB-CHANNEL OF CD-ROM DISC MAIN CHANNEL AUDIO DATA

SUMMARY OF THE INVENTION

The present invention is a method and apparatus for ensuring that MIDI (Musical Instrument Digital Interface) data stored in the subcode channel area of a compact disc is synchronized with the main channel audio of the compact disc. In this connection, U.S. Pat. No. 4,942,551 which issued Jul. 17, 1990 discloses an apparatus and method for encoding data in MIDI format on an audio compact disc without affecting the digitized sound stored in the main channel by utilizing what is known as the subcode channel of the compact disc which is reserved for information other than digitized compact disc audio data. However, the technique taught in the patent assumes that the processes of creating the main channel audio and the MIDI data are synchronized over time, and the only problem which must be addressed is ensuring that the start of the MIDI data stream is synchronized with the start of the main channel audio.

In this connection, it is possible to control the process of making main channel audio so that relying on start time synchronization will give good results by synchronizing the MIDI data to main channel audio data recorded directly onto the media which is used for mastering the compact disc, which media is generally known as PCM 1630 tape. However, since PCM 1630 tape and the process for creating a compact disc master tape are relatively expensive, it is usually preferable to use alternate systems and/or media while developing the MIDI data and main channel audio. For example, the main channel audio can be recorded on an F-1 tape first (e.g., a standard VHS formatted video tape with the audio recorded onto the video portion of the tape) instead of directly on the PCM 1630 tape. In this manner, errors can be corrected relatively inexpensively by re-recording the audio onto the F-1 tape until the audio is as desired.

However, since it is ultimately necessary to transfer the audio on the F-1 tape to a PCM 1630 tape which to be used for the compact disc master, synchronization problems are created resulting in a squashing or stretching of the audio data or MIDI data. One way this can occur stems from the fact that F-1 tape records and plays back at 29.97 frames per second while PCM 1630 tape records and plays back at 30 frames per second. The result is that even if the MIDI data and main channel audio data begin in sync, they will drift apart linearly over time. Although synchronization problems are introduced by the transfer, such problems can be fixed during the MIDI data adjustment performed by the present invention.

DETAILED DESCRIPTION OF THE INVENTION

The present invention utilizes three components to measure and fix MIDI data which has become out of sync with main channel audio data as during a transfer from F-1 to PCM 1630 format. These three components are as follows:
1. Playback simulation;
2. MIDI data/Main channel audio sync measurement; and
3. MIDI data adjustment.

Playback Simulation

Playback simulation simulates the playback of MIDI and audio data so that the resulting sound is the same as the sound which would be produced by playing a compact disc having that MIDI and main channel audio data, but before the expense of actually making the compact disc is incurred. This is accomplished by using audio and SMPTE time code from a PCM 1630 tape, or by using a copy of the PCM 1630 tape containing analog audio decoded from the 1630 tape on one audio channel and SMPTE from the 1630 tape on the other audio channel. If video tape is used, the video can include a time code window to allow reading of the time code visually. For this reason, if the 1630 tape is copied to video tape, it is frequently referred to as a "window dub." In this connection, the techniques and procedures needed to ensure that there is no temporal distortion in the Window Dub are well known and understood by persons skilled in the art. Thus, even if the tape player used to play the Window Dub or the PCM 1630 tape is running fast or slow, the SMPTE time code would run exactly as fast or slow. In this manner, since the MIDI data is clocked by the SMPTE time code on the Window Dub, the MIDI will run as fast or slow as the audio.

Prior to the start of playback simulation, the MIDI data from the recording session needs to be transferred to the system which will be used to process the MIDI data for placement into the subcode channel area of the compact disc. To ensure that a synchronization problem is not introduced during this transfer, the SMPTE time code on the Window Dub is used to clock a program used to process the MIDI data generated during the recording session. Additionally, the same "sequencer" used to record the MIDI data at the recording session should be used to playback the MIDI data during the transfer to the program used to process the MIDI data. But, this method will also correct any sequencer variations as long as those variations result in a linear squash or stretch.

MIDI Data/Main Channel Audio Sync Measurement

Audio played during playback of the Window Dub, and the separate audio generated by a synthesizer from MIDI data can be played so that they simulate the synchronization that would occur if a compact disc had been made with the data. These two audio streams known as synth (i.e., the result of MIDI data converted by the synthesizer into an audio output) and the main channel audio, can be simultaneously digitized by recording the analog audio and MIDI audio on a digital audio tape (DAT) recorder.

Portions of the digital audio can be captured for analysis using off-the-shelf hardware and software such as Digidesign Sound Designer II software and a Digidesign Sound Accelerator board with a Macintosh II computer.

An obvious audio event like a sudden change of dynamics (e.g., a quiet passage breaks into a load passage) can be used to measure the difference in time between the MIDI generated audio event and the same main channel audio event on a printout of the digitized waveforms with an accuracy of a few milliseconds.

The difference in sync should be measured near the beginning of the audio streams and near the end of the audio streams. Then, the computer program described below can be used to adjust the MIDI data by moving, stretching or shrinking the MIDI data to fit the main channel audio data.

MIDI Data Adjustment

If the audio event at the beginning of the audio stream is found to have unacceptable sync (greater than 33 msec for "tight" sync, and greater than 3.3 msec for "very tight" sync), a parameter passed to the program can be used to offset all of the data in a file containing the image of the sub-channel data thereby correcting the synchronization.

This moves all of the MIDI data with respect to the main-channel audio and should bring the beginning event into sync. The audio streams should be played again and the beginning audio event and the ending audio event should be measured for sync again.

If the beginning audio event is acceptable, but the ending event is out of acceptable sync, the MIDI data is stretched or shrunk as needed to obtain acceptable sync. Both operations leave the beginning MIDI audio event where it was, but change the ending MIDI audio event by an amount requested and linearly re-position all of the events in between.

Figure 1:
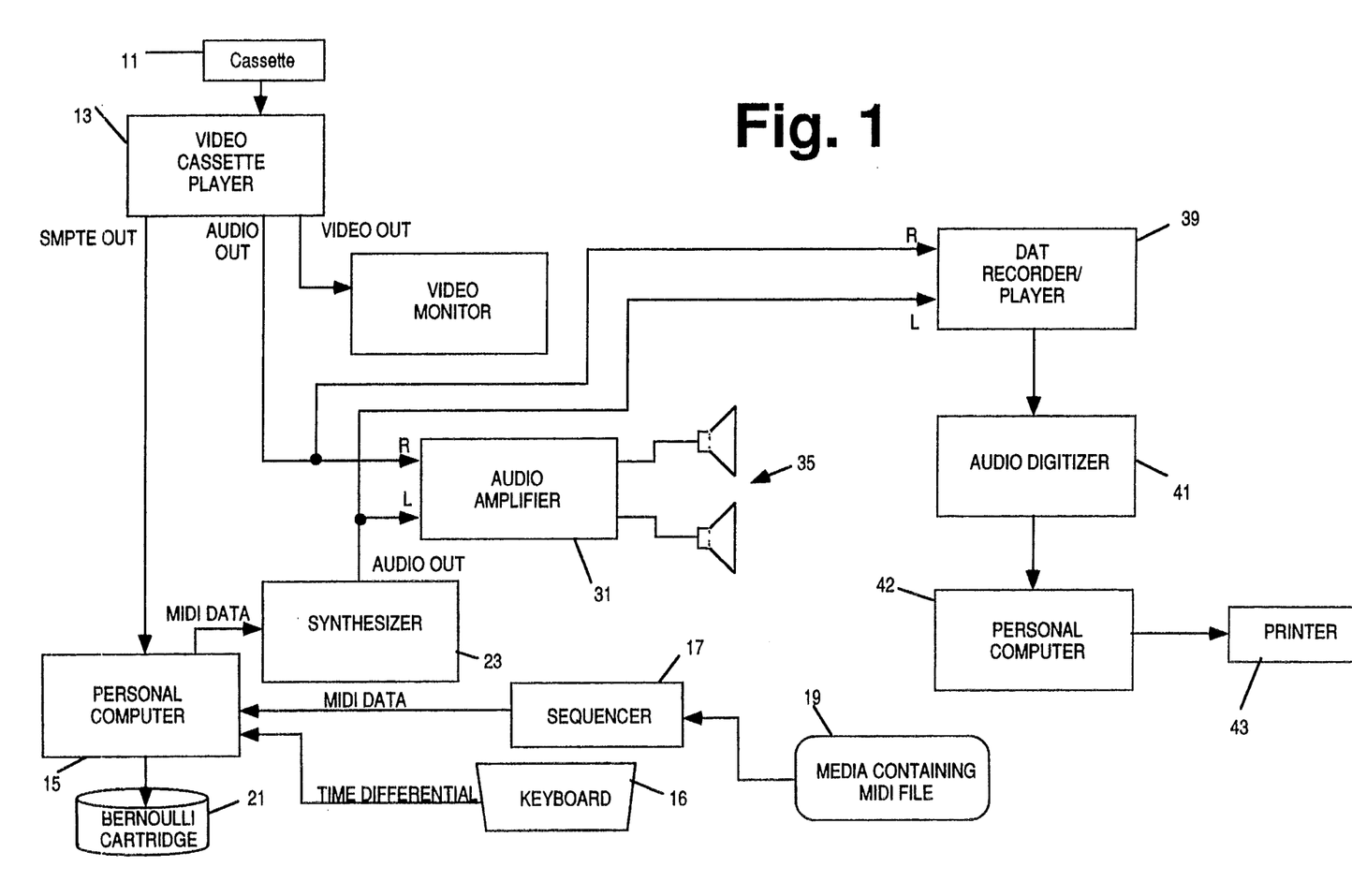
FIG. 1 is a block diagram of a system used to perform the synchronization according to the teachings of the present invention.

FIG. 1 is a block diagram of a system for implementing the present invention.

Cassette 11 is a ¾" video tape, ½" video tape, or other video tape format used to make a Window Dub. An audio tape with stereo tracks can also be used in which case there will be no video presentation of the time code which, while convenient, is not necessary to practice the invention. With a ¾" video tape, the video portion (Video Out) contains SMPTE time code window video data where the SMPTE time code can be non-drop frame (29.97 FPS) or drop frame (30 FPS average), but in the preferred embodiment, non-drop frame is used.

The first audio channel (Audio Out) is a mixture of right and left channel audio which when decoded forms analog digital audio on the 1630 tape and the second audio channel (SMPTE Out) is the SMPTE time code signal. The SMPTE time code signal can also be put on the center track if ¾ inch video tape is used. If ½" video tape is used, the video portion contains the SMPTE time code window with the right and left audio channels corresponding to the first and second audio channels of the ¾" video tape. If audio tape is used, the right and left audio channels correspond to the first and second audio channels of the ¾" video tape. The video (or audio) cassette is played back by video cassette (or audio cassette) player 13.

Player 13 generates three signals which are shown in FIG. 1 as SMPTE out (SMPTE time code signal), Audio out (right and left audio) and Video out (SMPTE time code window). Of course, if the player is an audio cassette player, there is no Video out signal. In this connection, when a video tape is used having a SMPTE time code window, during playback, a video image is generated comprising a window containing a display of time code as the time clock to playback the MIDI data.

The SMPTE out signal which, as noted above, is recorded on one of the audio channels, is input to a personal computer (PC) 15 such as an IBM PC or compatible computer having a time code reader board such as is available from Adriene Electronics of Nevada City, Calif. The other inputs to PC 15 are a time differential entry from a keyboard 16 and a MIDI signal from sequencer 17 which generates the MIDI signal from media 19 containing a MIDI file generated during a recording session. The MIDI signal is received by a MIDI interface board in computer 15 such as a Voyetra OP-4000/1 board based on Roland's MPU-401 technology. Details regarding such board may be found in the *OP-400/1 Intelligent PC/MIDI Interface Technical Reference Manual* published by Voyetra. A Bernoulli cartridge 21 containing an image of subcode channel data for a compact disc is created. A MIDI data signal is generated and input to synthesizer 23. The details for creating the Bernoulli cartridge and operation of the personal computer may be found in U.S. Pat. No. 4,942,551 where computer 15 in the patent corresponds to personal computer 15, MIDI source 11 in the patent corresponds to sequencer 17 and disk 17 in the patent corresponds to Bernoulli cartridge 21.

The MIDI data signal generated by a first personal computer 15 is created from the MIDI data signal from sequencer 17 and processed by a second personal computer 42 as follows.

A reference time used to clock the MIDI data signal is derived from two sources, the internal clock of computer 15 and the time code SMPTE out from the tape. Whenever a valid time code is read that is different from the last time code, indicating that a new frame has been read, the reference time is set to that value. However, since the time code is accurate to only one frame of video (1/30 second) and a timing resolution of one-tenth of a frame is needed (since there are ten subcode packs per frame), the internal clock of the computer is used to update the reference time between successive frames of video. A subroutine PLAY running in computer 15 performs this reference time calculation, calling GET_SMPTE to read the current timecode, SET_PACK_TIME to set the reference time and GET_PACK_TIME to update the reference time with the internal clock. Source code listing of these routines as well as other routines used by the present invention appear in Appendix 1 attached hereto.

Figure 2:
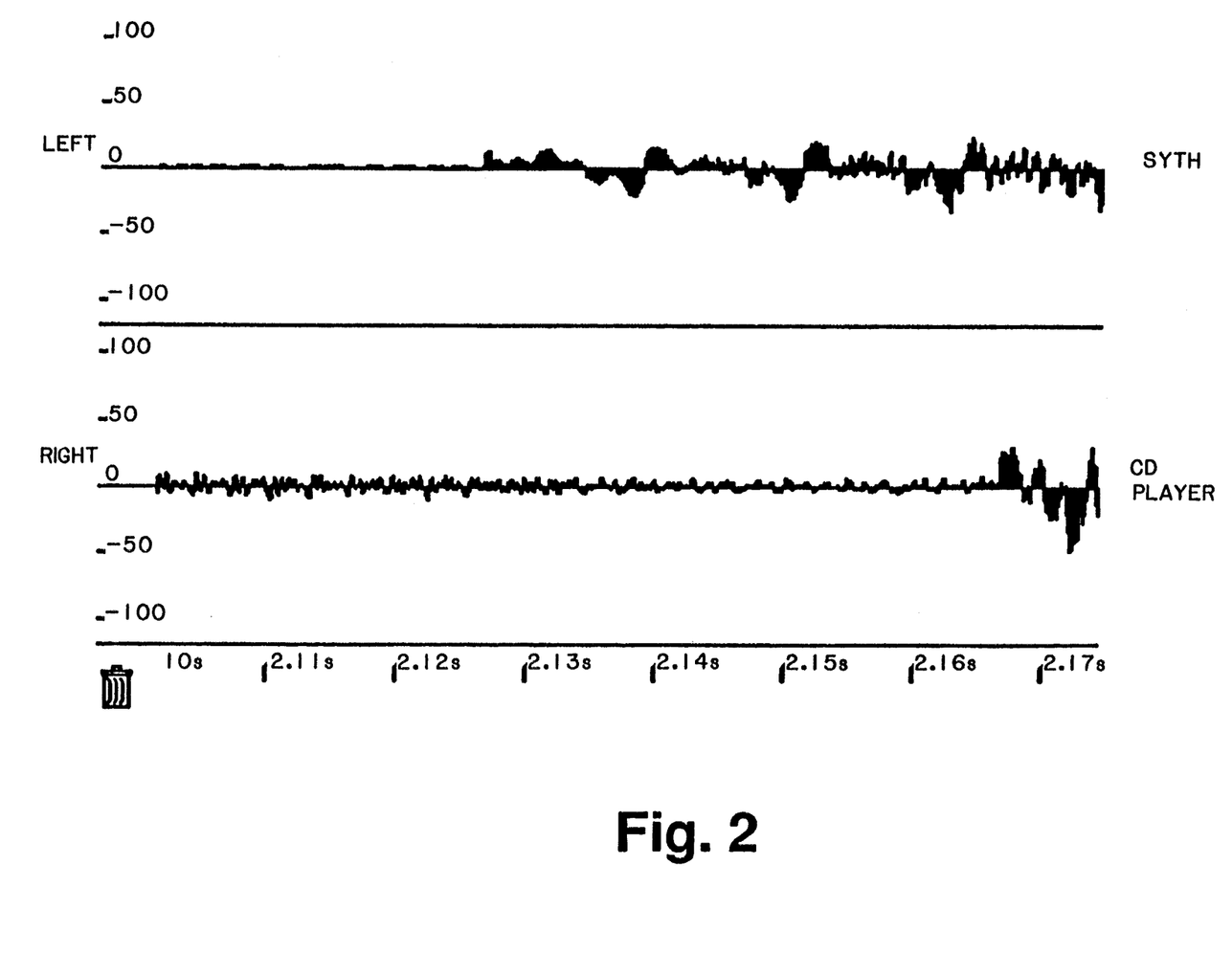
FIG. 2 is a representative printout from printer 43 used to determine the adjustments which need to be made to the MIDI data.
Figure 3A:
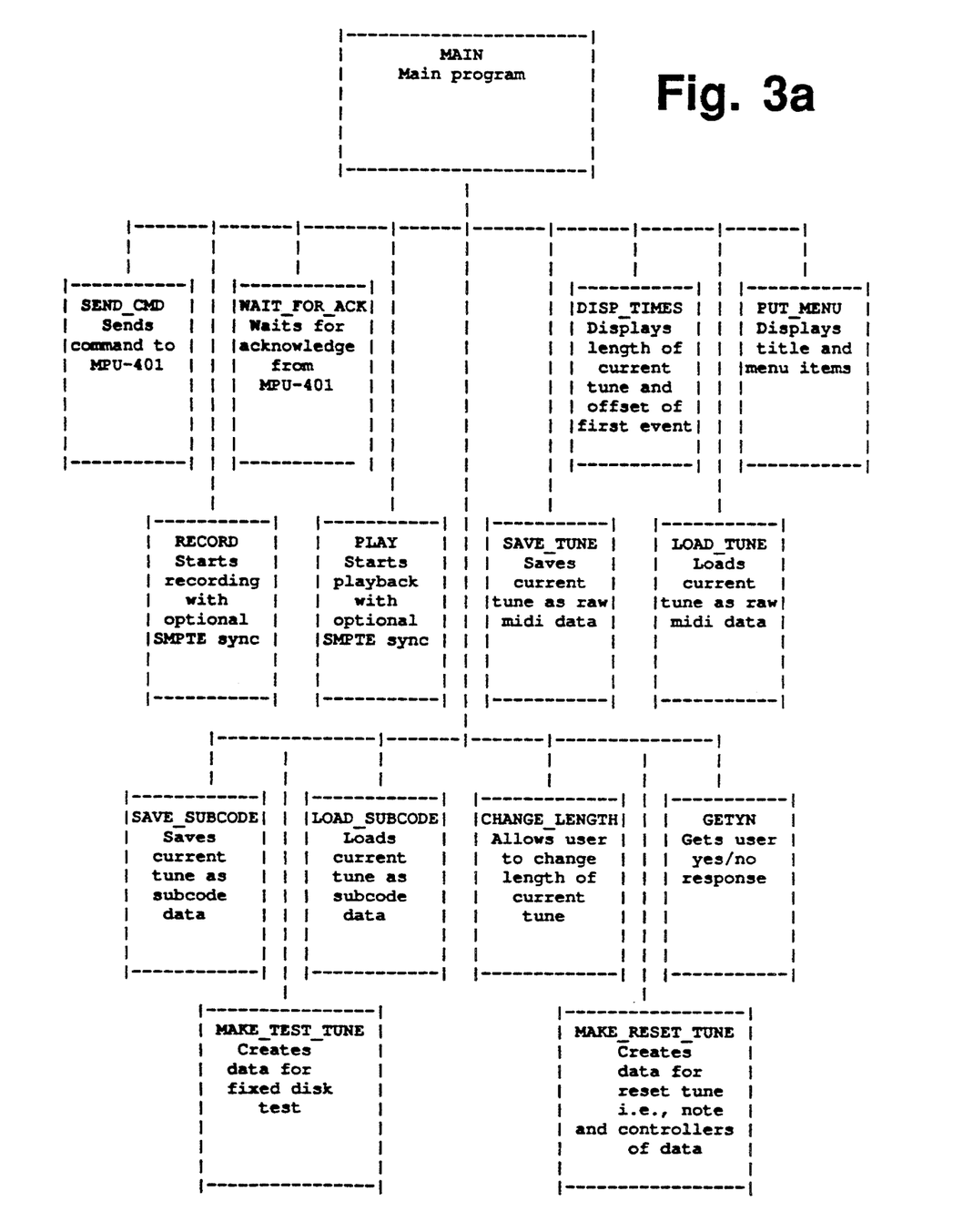
FIGS. 3A-3I are a block diagram of the software modules used by computer 15 to generate the subcode data and adjust the MIDI data stream.
Figure 3B:
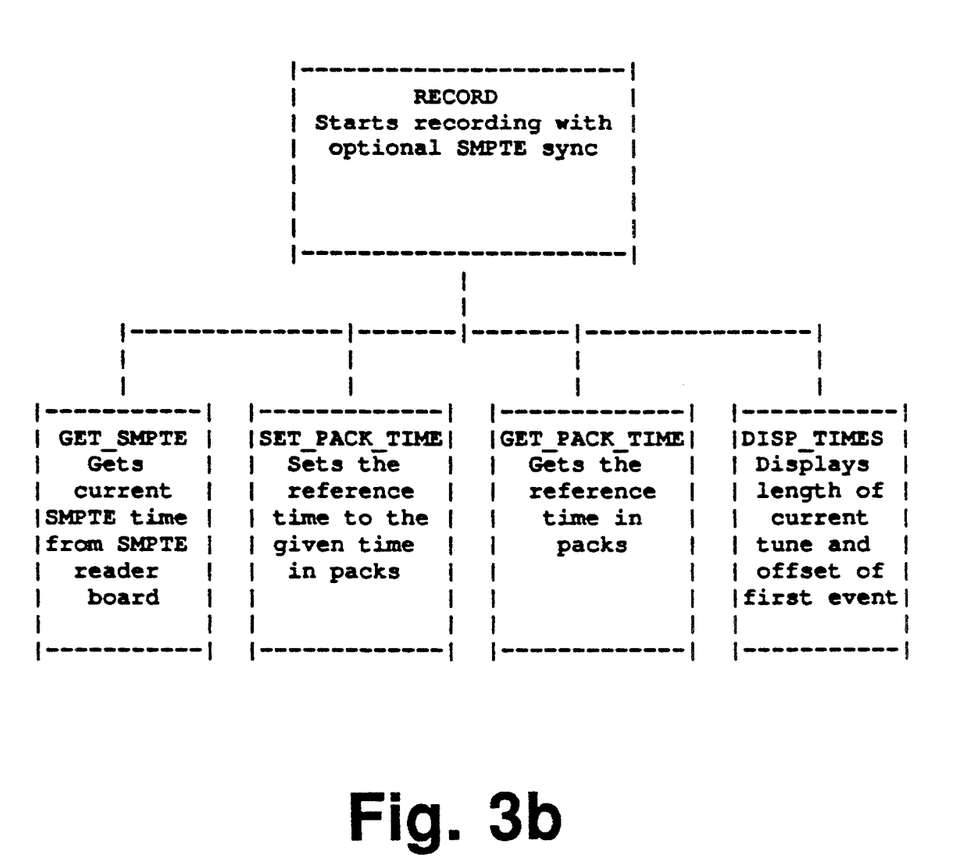
Figure 3C:
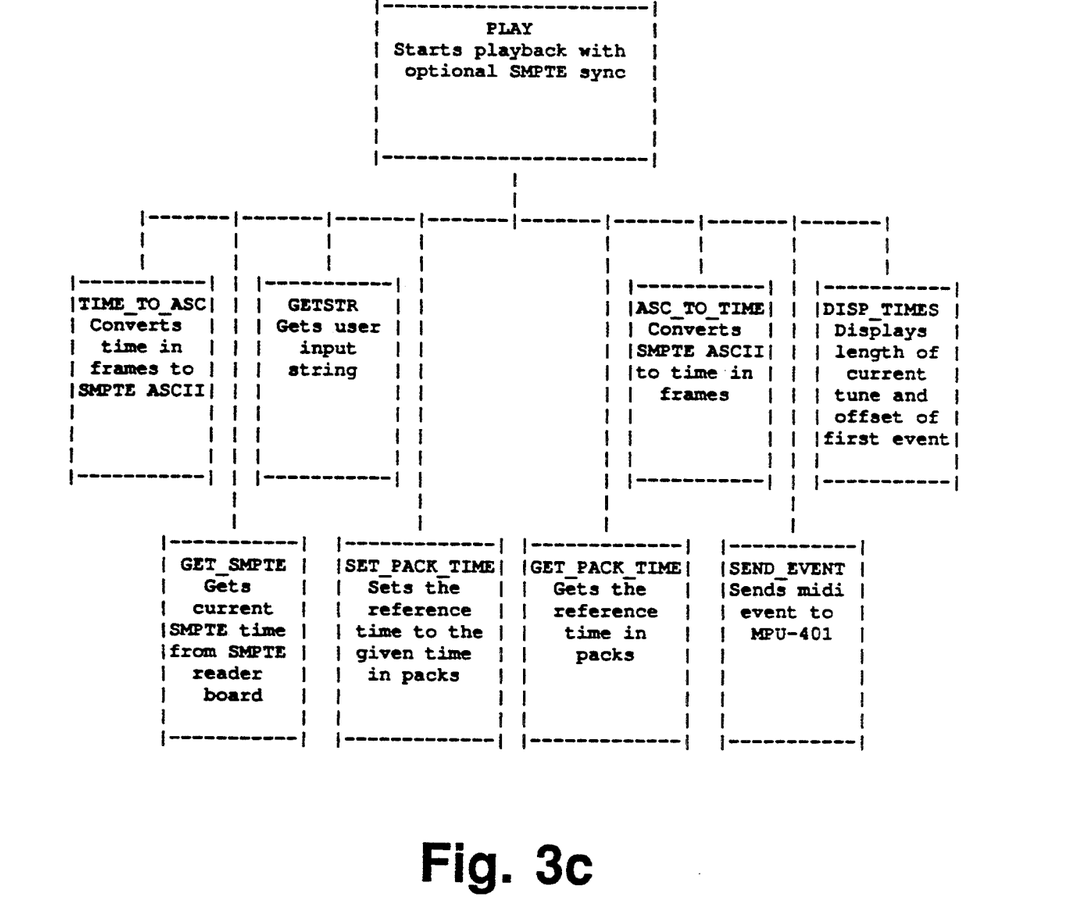
Figure 3D:
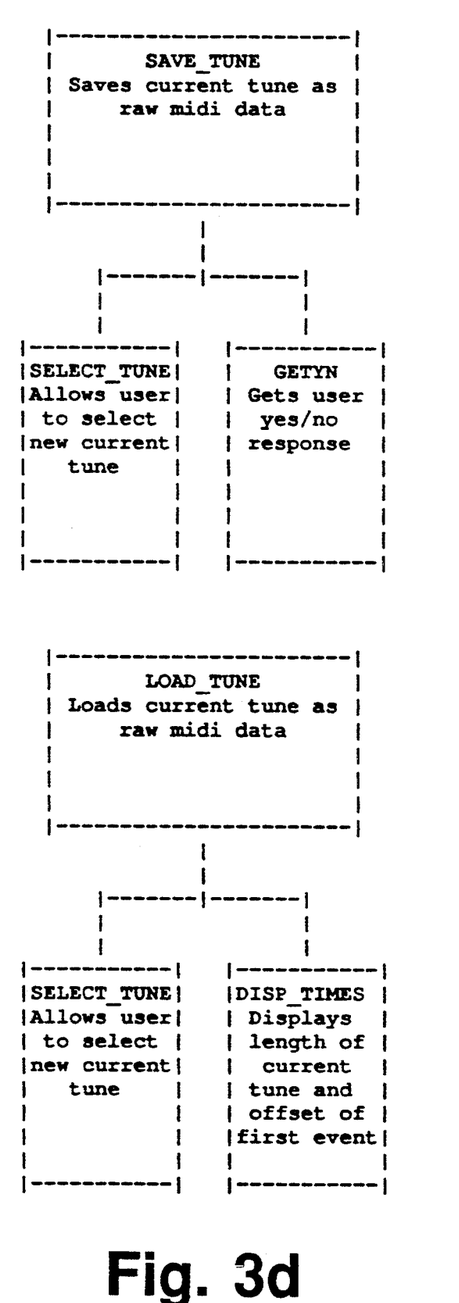
Figure 3E:
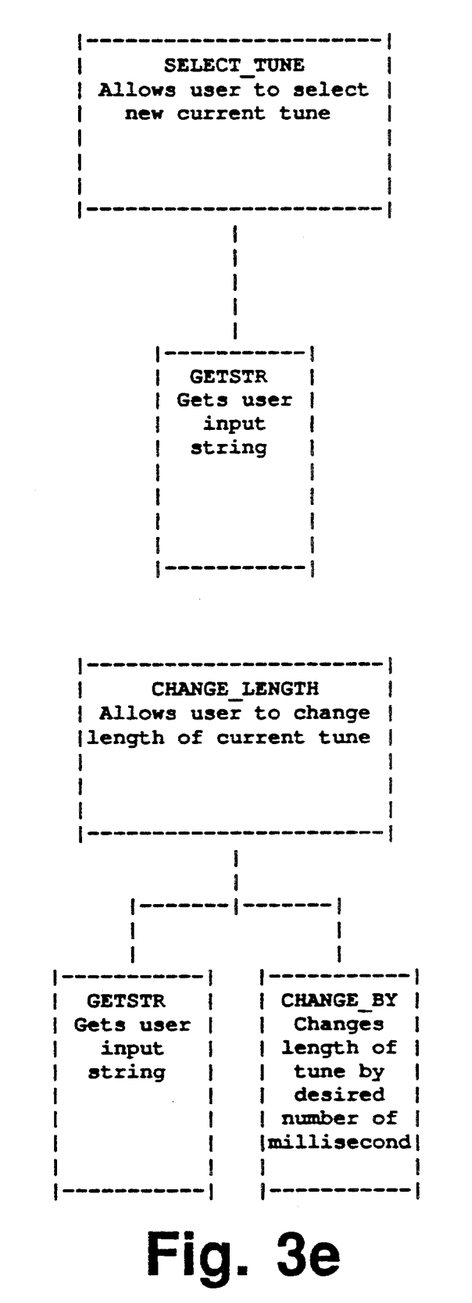
Figure 3F:
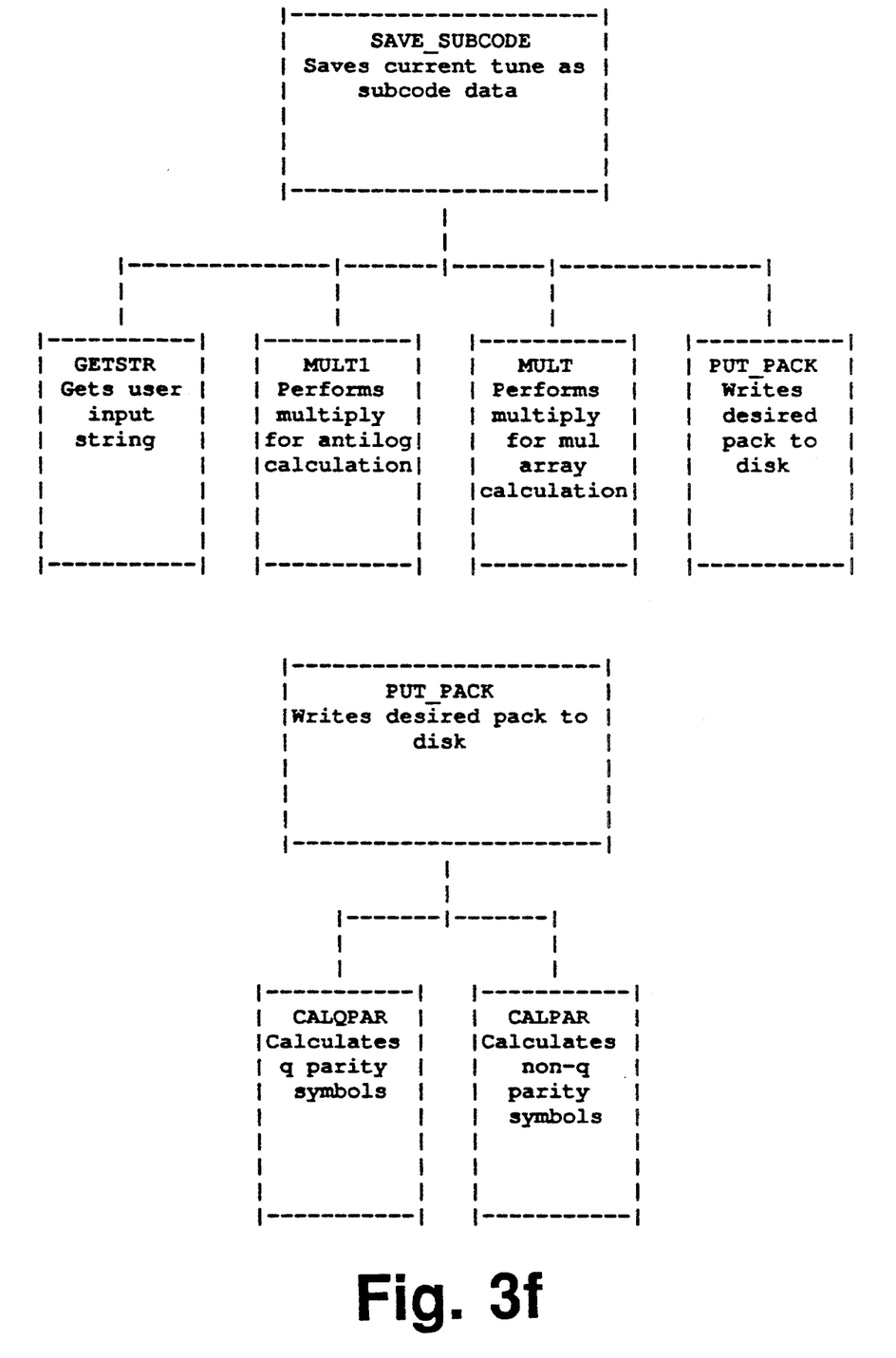
Figure 3G:
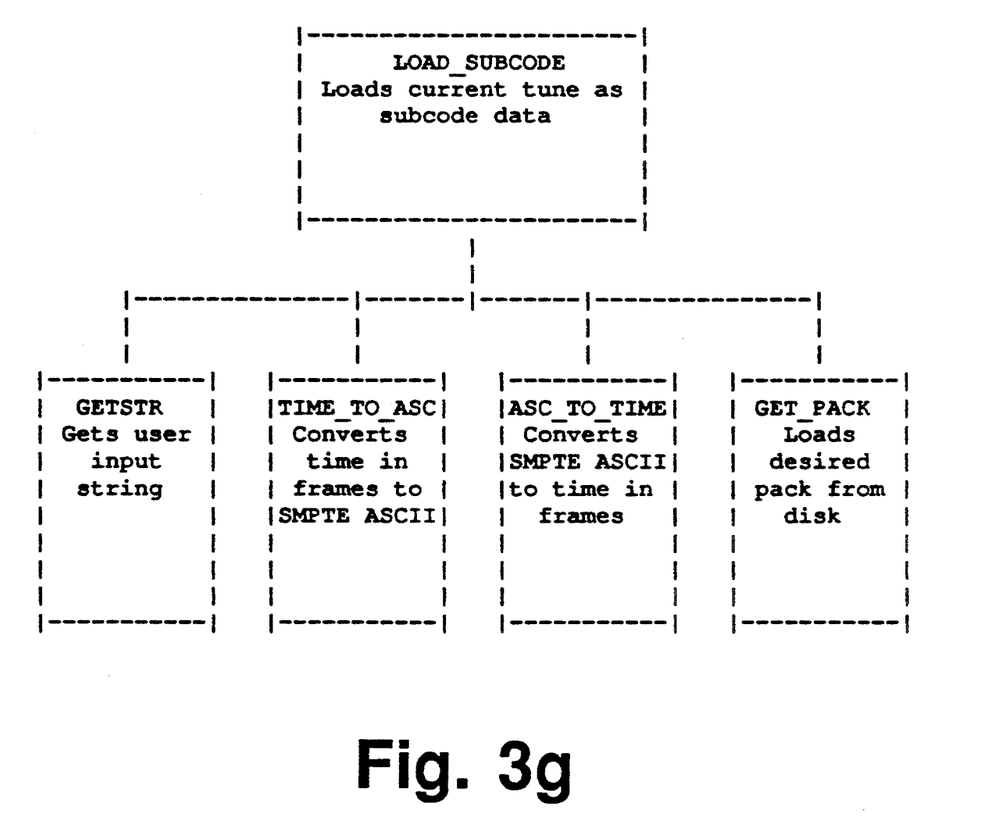
Figure 3H:
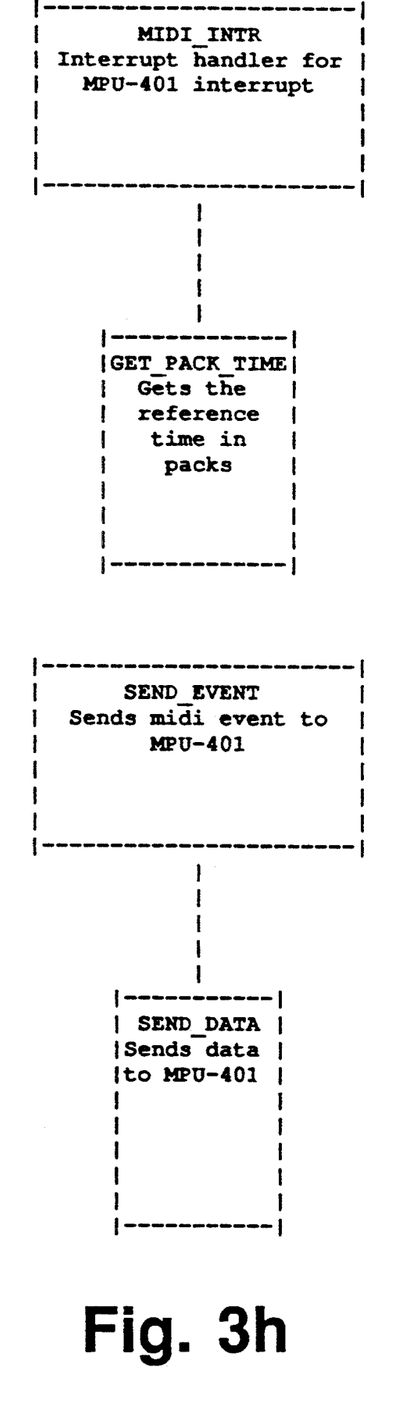
Figure 3I:
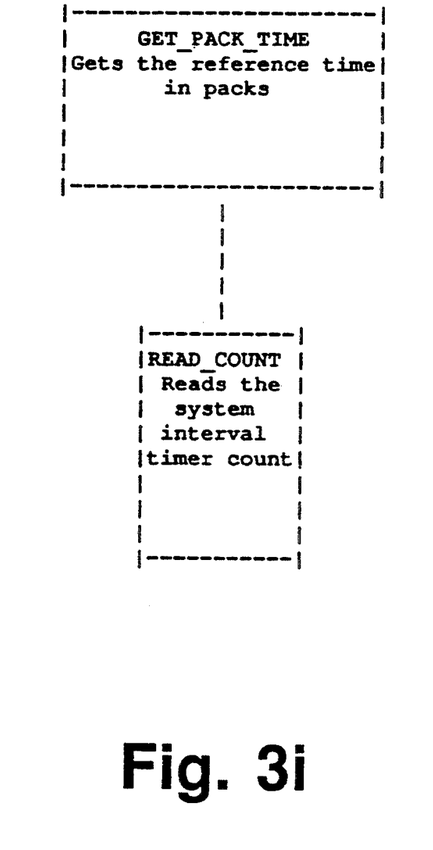

The playback simulation described above is performed by inputting to audio amplifier 31 the audio output signal from player 13 into one (e.g., the right channel) of the audio amplifier and the audio generated from the MIDI data by synthesizer 23 being input into the other audio channel (e.g., left) of audio amplifier 31. Audio amplifier 31 drives speakers 35. The MIDI data/main channel audio sync measurement is performed by inputting the audio signal from synthesizer 23 and the audio signal from player 13 into digital audio tape recorder/player 39. The signal output from player 39 which is a digital representation of digitized information on digital-audio tape created by DAT recorder/player 39 is input to audio digitizer 41 which is an audio digitizing box and board known as the Digidesign Sound Accelerator available from Digidesign Sound Tool Systems which manufactures such a board for plugging into a Macintosh II computer 42 along with software known as Digidesign Sound Designer which may be used to analyze a small portion of the digital audio signal generated by player 39. The digitized waveform may be displayed on a monitor or a printout from printer 43 by the operation of the Digidesign hardware and software tools. A sample printout of the digitized waveforms generated by the Digidesign Sound Designer II software and Digidesign Sound Accelerator board and Macintosh II computer is shown in FIG. 2. The difference between the two audio signals can be measured from the printout with an accuracy of a few milliseconds.

As noted above, the beginnings of the MIDI data and audio signal are compared and if they are not synchronized, the difference is measured from the printout and the measured difference is input to the SAVE_SUBCODE routine described in U.S. Pat. No. 4,942,551 as modified in Appendix 1 hereto which moves the MIDI data with respect to the main channel audio so that the beginning of the MIDI data and main channel audio are synchronized. The process is repeated with the beginning times synchronized and the difference between the ending times is measured from the printout. This difference is then input to the CHANGE_LENGTH routine also shown in Appendix 1 hereto which adjusts the ending of the MIDI data so that it is synchronized with the ending of the audio data and linearly adjusts all MIDI events in between to complete the synchronization of the MIDI data and audio data streams. Once the desired synchronization has been completed, the adjusted MIDI data stream is output to Bernoulli cartridge 21 and processing continues as described in U.S. Pat. No. 4,942,551.

The SAVE_SUBCODE routine described in U.S. Pat. No. 4,942,551 has been modified to allow the entry of the time position in the subcode data file where the MIDI data will be stored in tenths of a frame (a tenth of a frame is the subcode pack resolution, since there are ten packs per frame).

The desired amount by which to change the end time is input in milliseconds via keyboard 16 to the routine CHANGE_LENGTH, and the entered amount is then applied to the time of each MIDI event by the routine CHANGE_BY, which does the following:

The new end time in subcode packs (1/300 second, since there are 10 packs per frame) is calculated according to the formula:

$$Enew = E + 0.3 + C$$

where E=current end time in packs

Enew=desired end time in packs

C=desired change in end time in milliseconds.

The new end time is then used to calculate the new time of each MIDI event according to the formula:

$$Tnew = (T \times Enew)/E$$

where E=current end time in packs

Enew=desired end time in packs

T=current MIDI event time

Tnew=desired MIDI event time

Instead of manually entering the amount by which to change the end time to the CHANGE_LENGTH routine, additional hardware and software can be added to calculate the differences observed in the above-described embodiment of the invention and pass the calculated amount to the CHANGE_LENGTH routine to completely automate the process.

FIGS. 3a–3i are block diagrams of the computer software which runs in computer 15, which software generally operates as described in U.S. Pat. No. 4,942,551 with the differences in operation for the present invention as described herein. A brief description of each of the routines follows, with the source code for each routine appearing in Appendix I.

MAIN(int argc, char *argv[])

Main program which calls the major functions described below. Argc and *argv[] are optional command line parameters which control the operation of the program. The parameters are flags which cause the program to operate as described in the following table:

a) test_tune: Flag to indicate that test tune data should be generated by the program. Creates repeating "fixed data test" on entry to program. This can then be stored in a tune file, or saved directly as subcode data. The flag is TRUE if 't' or 'T' is passed as command line parameter. It is not normally used, but added to create "fixed data test" tune file for CDG (compact disc graphics) plus MIDI test disk.

b) reset_tune: Flag to indicate that reset tune data should be generated by program. Creates notes and controllers off MIDI messages on entry to program. This can then be stored in a tune file, or saved directly as subcode data. It is TRUE if 'r' or 'R' is passed as command line parameter. It is not normally used, but added to create reset tune file.

c) no_start-stop: Flag to indicate that MIDI start and stop messages should not be stored in subcode data before and after the current tune being saved. It is TRUE if 's' or 'S' is passed as command line parameter. It is not normally used, but useful when saving reset tune into a subcode file, when the MIDI start and stop are not desired.

d) old-format: Flag to indicate that old CDG+MIDI format should be used. This format has only 10 MIDI bytes per pack, and does not allow messages to be split across packs in 100% bandwidth, as well as differing in the location and encoding of mode and length data. It is TRUE if 'o' or 'O' is passed as command line parameter.

e) pad: Flag to indicate padding to full MIDI bandwidth desired. Pads subcode data save with channel O pitch bend commands. It is TRUE if 'p' or 'P' is passed as command line parameter. It is not normally used, but added to allow full bandwidth playback to be tested on CDG+MIDI test disk.

f) fast_write: Flag to indicate that graphics data should be ignored during subcode data file writes, to speed up the data transfer. It is TRUE if 'f' or 'F' passed as command line parameter.

PUT_MENU()

A routine which displays title, current tune and menu items.

RECORD(int smpte_sync)

Starts record with optional smpte sync (smpte_sync=TRUE) when MIDI start is received from sequencer 17. Displays time and records until Esc is hit, MIDI stop is received or out of memory. PLAY (int smpte_sync)

Starts playing back MIDI data with optional SMPTE sync. (smpte_sync==TRUE). Starts playing when the spacebar is hit, or when MIDI start is received from sequencer 17. Displays time and plays until Esc is hit, or MIDI stop is received.

SAVE_TUNE()

Saves current MIDI data in current tune file (tune_name), in raw format. For each MIDI event (including clocks), eight bytes are saved, four bytes (long) for time (in 1/300s of a second from start of tune), one byte for MIDI status, one byte for first data byte (key number if note event), one byte for second data byte (key velocity if note event), and one byte that is currently unused (set to zero). If tune file name contains no extension, ".TUN" is appended. Prompts user if file already exists, to allow overwrite to be avoided.

LOAD_TUNE()

Loads current MIDI data from current tune file (tune_name), in raw format. For each MIDI event in file, eight bytes are loaded, four bytes (long) for time (in 1/300s of a second from start of tune), one byte for midi status, one byte for first data byte (key number if note event), one byte for second data byte (key velocity if note event), and one byte that is currently unused (set to zero). If tune file name contains no extension, ".TUN" is appended. Displays length of tune loaded and SMPTE offset of first event.

SELECT_TUNE()

Allows user to change current tune filename (tune_name), and displays new current tune.

CHANGE_LENGTH()

Allows user to change the length of the current tune by a positive or negative number of milliseconds.

CHANGE_BY(int ms_change)

Changes the length of current tune by a positive or negative number of milliseconds (ms_change).

int GETSTR(int length,int caps_only)

Displays current value of data input string (in_text) at current screen position, moves cursor to end of string, and allows user to edit string by using backspace and entering characters. String input is limited to "length" (unless ("length"==0), and any alpha input is converted to capitals if "caps_only" is TRUE. Returns TRUE if user exits editing with CR, FALSE if user exits with ESC.

int GETYN()

Waits for user to enter 'Y' (or 'y'), 'N' (or 'n') or ESC. Returns TRUE if user entered 'Y' (or 'y'), FALSE otherwise.

TIME_TO_ASC(long time,char *asc)

Converts time in frames (time) to SMPTE ASCII (*asc).

long ASC_TO_TIME(char *asc)

Converts SMPTE ASCII (*asc) to time in frames. Returns −1 if bad SMPTE time.

DISP_TIMES()

Displays the length of current tune and SMPTE offset of the first event.

interrupt MIDI_INTR()

Called whenever interrupt is received from MPU-401. Reads data from MPU-401 and records it.

SEND_EVENT(unsigned char status,unsigned char byte1, unsigned char byte2)

Sends MIDI event to MPU-401.

SEND_CMD(unsigned char cmd)

Sends command to MPU-401.

WAIT_FOR_ACK()

Waits for acknowledge from MPU-401.

SEND_DATA(unsigned char data)

Sends data to MPU-401.

long GET_SMPTE()

Returns current SMPTE time from SMPTE reader board in personal computer 15, or −1 if invalid.

SET_PACK_TIME(unsigned long new_pack_time)

Sets the current reference time to the given time (new_pack_time) in packs.

unsigned long GET_PACK_TIME()

Returns the current reference time in packs.

unsigned READ_COUNT()

Returns the system interval timer count.

SAVE_SUBCODE()

Saves current MIDI data into a subcode data file. Prompts user with last entered subcode file name (or default at start), and allows it to be changed. Checks that the subcode file exists, and that it is a multiple of ten packs (240) in length. Allows user to change/enter number of seconds and frame tenths to start of audio, then checks that there is enough room in the subcode file to save all MIDI data with that lead in (this is only an estimate, since a low bandwidth could stretch out MIDI data). It "lines up" the first non-clock MIDI event with the position in the subcode file of the time to start of audio. It should be noted that extremely tight sync ( e.g., less than 1 msec) can be attempted by offsetting the data within a sub-channel pack by beginning the pack with extra MIDI instructions (such as repeated "note on" or "note off" data). However, currently available CDMIDI players playback with less tolerance than 1 msec, so, such extremely tight sync may only be useful when the technology is more mature. It then "moves back" to the position of the previous clock in the MIDI data, and starts storing a pack containing only a "MIDI START" one pack before the time the clock should fall in the subcode file, given the previous "lining up". Stores only in packs not containing graphics data, clearing any unneeded packs previously containing MIDI data. After the pack containing first clock after end of "real" MIDI data, stores a pack containing "MIDI STOP", then clears the remainder of the subcode file that does not contain graphics. Displays error message if all the MIDI data did not fit. Includes the function MULT1 which performs a multiply for antilog calculation and the function MULT which performs a multiply for mul array calculation.

int PUT_PACK(long *cur_pack,unsigned length)

Calculates parity symbols (CALQPAR and CALPAR functions) for current pack (pack) of given length (length), and stores these and the length in the current pack. Stores pack in subcode file at given pack location (*cur_pack), or subsequent pack not containing graphics data, setting pack location (*cur_pack) to where it was stored. Returns FALSE if successfull, TRUE otherwise.

LOAD_SUBCODE()

Loads current MIDI data from subcode data file. Prompts user with last entered subcode file name (or default at start), and allows it to be changed. Checks that the subcode file exists, and that it is a multiple of ten packs (240) in length. Allows user to choose a start time and end time for the data load, then loads only those packs encoded as MIDI data from the subcode data file.

int GET_PACK(long cur_pack)

Loads current pack (pack) from given subcode file pack position (cur_pack). Returns FALSE if successfull, TRUE if past end time or error reading file.

MAKE_TEST_TUNE()

Creates data for "fixed data test".
MAKE_RESET_TUNE()

Creates data for reset tune, i.e. note and controllers off data.

We claim:

1. A system for storing MIDI data in subcode packs for encoding on a compact disc having a main channel and a subcode channel such that the MIDI data is stored in the subcode channel and is synchronized with audio data in the main channel comprising:
   a) time code and audio data generating means for generating a first output signal representing a SMPTE time code and a second output signal representing said audio data to be stored in said main channel;
   b) MIDI data generating means for generating a third output signal representing said MIDI data to be stored in said subcode channel;
   c) computer means coupled to said time code and audio data generating means and said MIDI data generating means for receiving said first, second and third output signals, said computer means including a program means for:
      i) receiving an input representing a time differential between a beginning of said MIDI data and a beginning of said audio data and an input representing a time differential between an ending of said MIDI data and an ending of said audio data, and using said time differentials and said first, second and third output signals to adjust the length of said MIDI data so that its starting and ending times are synchronized with the starting and ending times of said audio data; and
      ii) converting said synchronized MIDI data to a plurality of subcode packs and writing said subcode packs to a storage medium;
   wherein said time differentials are determined utilizing a subsystem comprising:
   d) synthesizer means coupled to said computer means for converting MIDI data output by said computer means to an audio signal as a fourth output signal:
   e) digital recorder/player means coupled to said time code audio data generating means and said synthesizer means for receiving said second output signal and said fourth output signal, digitizing said second and fourth output signals and outputting a digital signal representation of said digitized second and fourth output signals:
   f) audio digitizer means coupled to said digital recorder/player means for receiving and converting said digital signal representation to a pair of waveforms to be visually displayed, one of said pair of waveforms representing said MIDI data and the other of said pair of waveforms representing said audio data:
   whereby said time differential is determined based upon a comparison of said pair of waveforms.

2. The system defined by claim 1 wherein said comnputer means includes a keyboard and said time differentials are manually entered via said keyboard.

3. A method for storing MIDI data in subcode packs for encoding on a compact disc having a main channel and a subcode channel such that the MIDI data is stored in the subcode channel and is synchronized with audio data in the main channel comprising the steps of:
   a) generating a first output signal representing a SMPTE time code and a second output signal representing said audio data to be stored in said main channel;
   b) generating a third output signal representing said MIDI data to be stored in said subcode channel;
   c) receiving said first, second and third output signals, and an input representing a time differential between a beginning of said MIDI data and a beginning of said audio data and an input representing a time differential between an ending of said MIDI data and an ending of said audio data; and
   d) using said time differentials and said first, second and third output signals to adjust the length of said MIDI data so that its starting and ending times are synchronized with the starting and ending times of said audio data; and
   e) converting said synchronized MIDI data to a plurality of subcode packs and writing said subcode packs to a storage medium;
   wherein said time differentials are determined utilizing the further steps of:
   f) converting MIDI data output by a computer to an audio signal as a fourth output signal;
   g) receiving said second output signal and said fourth output signal:
   h) digitizing said second and fourth output signals and outputting a digital signal representation of said digitized second and fourth output signals;
   i) converting said digital signal representation of said digitized second and fourth output signals to a pair of waveforms to be visually displayed, one of said pair of waveforms representing said MIDI data and the other of said pair of waveforms representing said audio data;
   whereby said time differential is determined based upon a comparison of said pair of waveforms.

4. The method defined by claim 3 wherein said time differentials are manually entered via a keyboard coupled to a computer.

5. The method defined by claim 3 further comprising the steps of comparing said pair of waveforms and utilizing the results of said comparison to determine said time differential.

* * * * *